US012756197B2

(12) United States Patent
Kim et al.

(10) Patent No.: US 12,756,197 B2
(45) Date of Patent: Oct. 6, 2026

(54) POWER MANAGEMENT SYSTEM

(71) Applicant: TECHWIN CO., LTD., Cheongju-si (KR)

(72) Inventors: Jung Sik Kim, Sejong-si (KR); Hyun Su Shin, Daejeon (KR); Sun Teak Hyun, Cheongju-si (KR)

(73) Assignee: TECHWIN CO., LTD., Cheongju-si (KR)

( * ) Notice: Subject to any disclaimer, the term of this patent is extended or adjusted under 35 U.S.C. 154(b) by 431 days.

(21) Appl. No.: 18/533,325

(22) Filed: Dec. 8, 2023

(65) Prior Publication Data

US 2024/0106239 A1 Mar. 28, 2024

Related U.S. Application Data

(63) Continuation of application No. PCT/KR2022/004777, filed on Apr. 4, 2022.

(30) Foreign Application Priority Data

Jul. 6, 2021 (KR) ........................ 10-2021-0088294

(51) Int. Cl.
*H02J 3/32* (2026.01)
*C25B 1/04* (2021.01)
(Continued)

(52) U.S. Cl.
CPC .................. *H02J 3/32* (2013.01); *C25B 1/04* (2013.01); *H01M 8/04947* (2013.01);
(Continued)

(58) Field of Classification Search
CPC .. H02J 3/32; H02J 3/40; H02J 2101/20; H02J 2101/30; C25B 1/04; H01M 8/04947; H01M 16/003
(Continued)

(56) References Cited

U.S. PATENT DOCUMENTS

2005/0198963 A1 9/2005 Wai et al.
2009/0189445 A1 7/2009 Strizki
(Continued)

FOREIGN PATENT DOCUMENTS

EP 2855736 B1 1/2019
JP 2006-161123 A 6/2006
(Continued)

OTHER PUBLICATIONS

International Search Report issued in PCT/KR2022/004777; mailed Jul. 12, 2022.

*Primary Examiner* — Michael R. Fin
(74) *Attorney, Agent, or Firm* — Studebaker Brackett PLLC

(57) ABSTRACT

An aspect of the present disclosure provides a power management system including: a power source that includes a power system for providing main power to a load and a renewable energy generation part for providing auxiliary power; a power conversion part that converts a surplus of at least one of the main power and the auxiliary power; a water electrolysis part that includes a water electrolysis device configured to be driven by the surplus converted by the power conversion part, a balance-or-plant (BOP) configured to be driven by a portion branched from the main power, and a hydrogen storage; and a control part that synchronizes power applied to the power conversion part and power applied to the water electrolysis device to exchange direct current (DC) power between the power conversion part and the water electrolysis device.

13 Claims, 5 Drawing Sheets

(51) Int. Cl.

| | |
|---|---|
| ***H01M 8/04858*** | (2016.01) |
| ***H01M 16/00*** | (2006.01) |
| ***H02J 3/40*** | (2026.01) |
| *H02J 101/20* | (2026.01) |
| *H02J 101/30* | (2026.01) |

(52) U.S. Cl.
CPC ............. *H01M 16/003* (2013.01); *H02J 3/40* (2013.01); *H02J 2101/20* (2026.01); *H02J 2101/30* (2026.01)

(58) Field of Classification Search
USPC ............................................................ 307/43
See application file for complete search history.

(56) References Cited

U.S. PATENT DOCUMENTS

| | | | | |
|---|---|---|---|---|
| 2012/0326653 | A1* | 12/2012 | Godrich .................... | H02J 1/10<br>361/679.02 |
| 2021/0079544 | A1 | 3/2021 | Harikumaran et al. | |
| 2021/0249896 | A1* | 8/2021 | Panfil ........................ | H02J 3/32 |

FOREIGN PATENT DOCUMENTS

| | | | |
|---|---|---|---|
| JP | 2021-059748 | A | 4/2021 |
| KR | 10-2013-0093402 | A | 8/2013 |
| KR | 10-1302131 | B1 | 8/2013 |
| KR | 10-2017-0008401 | A | 1/2017 |
| KR | 10-1926010 | B1 | 12/2018 |
| KR | 10-2020-0125483 | A | 11/2020 |

* cited by examiner

POWER MANAGEMENT SYSTEM

CROSS-REFERENCE TO RELATED APPLICATIONS

The present application is a continuation of International Patent Application No. PCT/KR2022/004777, filed on Apr. 4, 2022, which is based upon and claims the benefit of priority to Korean Patent Application No. 10-2021-0088294, filed on Jul. 6, 2021, in the Korean Intellectual Property Office. The disclosures of the above-listed applications are hereby incorporated by reference herein in their entirety.

TECHNICAL FIELD

The present disclosure is directed to providing a power management system, and more particularly, a power management system for effectively managing and utilizing surplus power generated from a power source.

BACKGROUND ART

A typical energy storage system (ESS) used in conventional power systems is a system that stores electric power generated under a light load during late-night hours and supplies the electric power under a heavy load during mid-day hours to increase energy efficiency. Recently, various types of ESSs using batteries have been developed and distributed.

In South Korea, frequency regulation is performed for generators such as coal-fired power generators, oil power generators, combined cycle power generators, and hydroelectric power generators through governor free (G/F) and auto generation control (AGC) operations and the like to maintain a power system frequency that changes in real time.

ESSs such as batteries can be charged/discharged quickly and thus may replace G/F and AGC, thereby reducing fuel costs of coal-fired generators and improving power generation efficiency.

However, energy storage devices using batteries such as lead storage batteries, lithium ion batteries (LIB), sodium sulfur batteries (NaS), and redox flow batteries (RFB) should be periodically replaced due to performance degradation caused by an ambient temperature and the number of charging and discharging cycles, and the disposal of used batteries is a considerable burden.

In order to reduce a burden on the replacement of energy storage devices and improve storage efficiency, Korean Patent Registration No. 10-1829311 discloses an energy storage system including a water electrolysis device and a hydrogen storage device to discharge excess power of the system, convert the excess power into hydrogen, and store the hydrogen, and a fuel cell for charging the system when power is insufficient. However, the energy storage system uses only the system as a power source and thus it is difficult to stably and continuously provide power to be stored when a problem occurs in the system.

Accordingly, attempts are being actively made to convert power provided from a renewable energy source (renewable energy generation part) in connection with the system. However, renewable energy sources are highly dependent on surrounding environmental factors such as climate conditions and thus it is difficult to generate and provide electric power from renewable energy sources regularly and stably. For example, when excess power from a renewable energy source is added to the system or power from the system does not meet the demand of the load, it is necessary to store or utilize surplus power or supplement insufficient power.

Various technologies are being developed to utilize surplus power, and particularly, the importance of technology for producing hydrogen as a clean energy source replacing fossil fuels is emerging. Because electric energy, i.e., electric power, is essential in producing hydrogen, a technique for producing hydrogen while minimizing power consumption is required.

Korean Patent Registration No. 10-1926010 discloses a system in which a water electrolysis device uses power provided from not only the system but also a renewable energy generation part to produce hydrogen while minimizing the consumption of the power provided from the system, and converts hydrogen generated using a fuel cell into electric power and provides the hydrogen to the system when necessary. However, the water electrolysis device is integrally driven by power obtained by conversion by a DC/DC converter and/or an AC/DC converter, and thus, when a problem occurs in converters between a power source (including the system and the renewable energy generation part) and the water electrolysis device, lines, etc., the water electrolysis device cannot be operated stably, and a total amount of surplus power is stored by being converted into hydrogen, thus causing a risk of explosion and making it difficult to store surplus power stably.

DISCLOSURE

Technical Problem

To address the above-described problem of the related art, the present disclosure is directed to providing a power management system for effectively and stably managing, storing, and utilizing surplus power generated from a power source including the power system and a renewable energy generation part.

Technical Solution

As aspect of the present disclosure provides a power management system comprising: a power source that includes a power system configured to provide main power to a load and a renewable energy generation part configured to provide auxiliary power, a power conversion part configured to convert a surplus of at least one of the main power and the auxiliary power, a water electrolysis part including a water electrolysis device configured to be driven by the surplus converted by the power conversion part, a balance-of-plant (BOP) configured to be driven by a portion branched from the main power, and a hydrogen storage, and a control part configured to synchronize power applied to the power conversion part and power applied to the water electrolysis device to exchange direct current (DC) power between the power conversion part and the water electrolysis device.

In an embodiment, the power management system may further include an energy storage configured to store a portion of the surplus converted by the power conversion part.

In an embodiment, the water electrolysis device may be driven by a portion of the surplus stored in the energy storage.

In an embodiment, the control part may synchronize power applied to at least one of the power conversion part and the water electrolysis device and power applied to the energy storage to exchange DC power between two or more of the power conversion part, the water electrolysis device, and the energy storage.

In an embodiment, the surplus may include at least one of alternating current (AC) power provided from the power system and DC power and AC power provided from the renewable energy generation part.

In an embodiment, the power conversion part may include an AC/DC converter configured to convert AC power provided from at least one of the power system and the renewable energy generation part into DC power, and provide the DC power to the control part, and a DC/DC converter configured to convert voltage of DC power provided from the renewable energy generation part and provide the DC power converted by the DC/DC converter to the control part.

In an embodiment, the power conversion part may further include a DC/AC inverter configured to convert DC power provided from at least one of the renewable energy generation part and the energy storage into AC power and provide the AC power to the power system.

In an embodiment, the power management system may further include a fuel cell configured to generate DC power using hydrogen stored in the hydrogen storage.

In an embodiment, the DC power generated by the fuel cell may be synchronized through the control part to be provided to at least one of the energy storage and the water electrolysis device.

In an embodiment, the DC power generated by the fuel cell may be converted into AC power through the control part and the DC/AC inverter, and the AC power may be provided to the power system.

In an embodiment, the water electrolysis device may start driving when an amount of power stored in the energy storage is 50% or more of a maximum charging amount.

In an embodiment, the water electrolysis device may be configured by connecting two or more water electrolysis stacks of different driving power in parallel.

In an embodiment, the driving power of at least one of the water electrolysis stacks may be less than or equal to driving power of the water electrolysis device.

Advantageous Effects

According to an aspect of the present disclosure, a power management system includes: a power source that includes a power system for providing main power to a load and a renewable energy generation part for providing auxiliary power; a power conversion part that converts at least one surplus among the main power and the auxiliary power; a water electrolysis part that includes a water electrolysis device configured to be driven by a result of converting the surplus, a balance-or-plant (BOP) configured to be driven by power split from the main power, and a hydrogen storage; and a control part that synchronizes power provided to the power conversion part and power provided to the water electrolysis device with each other to exchange direct current (DC) power between the power conversion part and the water electrolysis device, and thus is capable of effectively and stably managing, storing and using surplus power generated from the power source including the power system and the renewable energy generation part.

The power management system is capable of dualizing surplus power into DC power and hydrogen and respectively storing the DC power and the hydrogen in an energy storage system (ESS) and/or a hydrogen storage to improve energy storage stability and maximize energy utilization. In particular, by independently supplying power to the water electrolysis device and the BOP of the water electrolysis part, the supply of power to the BOP can be maintained to stably store generated hydrogen even when the supply of power to the water electrolysis device is cut off.

In addition, in the power management system, power to be exchanged between components or devices other than the power system is set to DC power to minimize power loss in the power management system and effectively suppress a change of auxiliary power provided from the renewable energy generation part.

It should be understood that effects of the present disclosure are not limited thereto and include all effects inferable from the configuration of the present disclosure described in the detailed description or claims of the present disclosure.

MODES OF THE INVENTION

Figure 1:
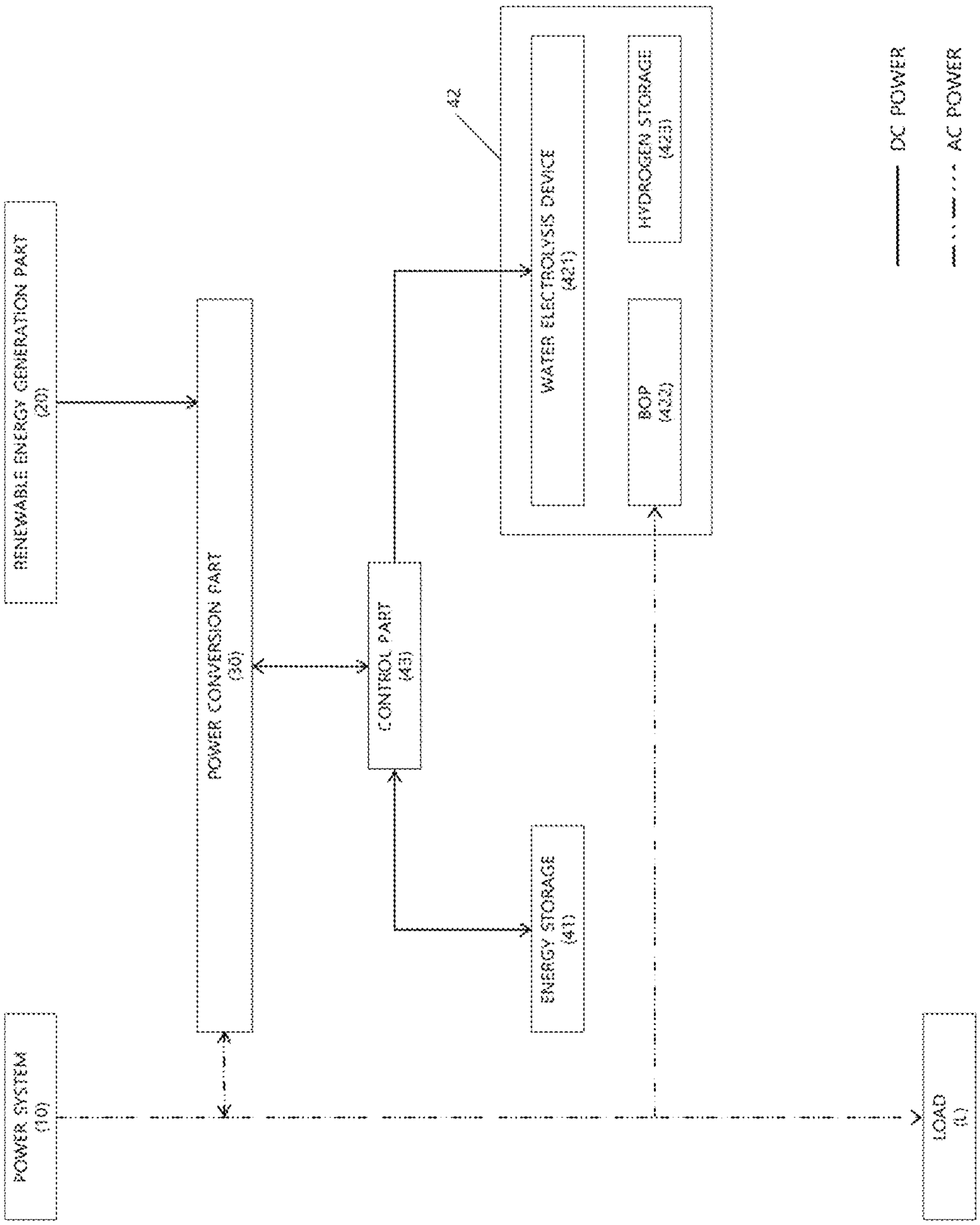
FIG. 1 illustrates a power management system according to an embodiment of the present disclosure.

Hereinafter, the present disclosure will be described in detail with reference to the accompanying drawings. However, the present disclosure may be embodied in many different forms and thus is not limited to embodiments set forth herein. For clarity, parts that are not related to clearly describing the present disclosure are omitted in the drawings, and like components are denoted by like reference numerals throughout the specification.

Throughout the specification, it will be understood that when an element is referred to as being “connected” to another element, the element is “directly connected” to the second element or is “indirectly connected” to the other element with another element therebetween. It will be understood that when an element is referred to as “including” another element, the element may further include other elements unless mentioned otherwise.

Hereinafter, embodiments of the present disclosure will be described in detail with reference to the accompanying drawings.

FIG. 1 illustrates a power management system according to an embodiment of the present disclosure.

Referring to FIG. 1, the power management system according to an aspect of the present disclosure includes: a power source that includes a power system 10 for providing main power to a load L and a renewable energy generation part 20 for providing auxiliary power; a power conversion part 30 that converts a surplus of at least one of the main power and the auxiliary power; a water electrolysis part 42 that includes a water electrolysis device 421 configured to be driven by the surplus converted by the power conversion part, a balance-or-plant (BOP) 422 configured to be driven by a portion branched from the main power, and a hydrogen storage 423; and a control part 43 that synchronizes power applied to the power conversion part 30 and power applied to the water electrolysis device 421 with each other to exchange direct current (DC) power between the power conversion part 30 and the water electrolysis device 421.

The power management system may further include an energy storage 41 that stores a portion of the surplus converted by the power conversion part, and the water electrolysis device 421 can be driven by a portion of the surplus stored in the energy storage 41.

The power system 10 may provide alternating current (AC) power as main power to the load L, and DC power and/or AC power provided from the renewable energy generation part 20 may be converted into AC power through the power conversion part 30 to provide auxiliary power to the load L.

The main power and the auxiliary power may complement insufficient power periodically and/or in real time according to the demand of power for the load L. Surplus power generated when both the main power and the auxiliary power are provided may be stored after being converted/changed into DC power, hydrogen, or the like through the power conversion part 30, the energy storage 41, the water electrolysis part 42, etc., and may be converted/changed into AC power and provided to the load L when power shortage occurs later.

The renewable energy generation part 20 may be, but is not limited to, power generation equipment using one energy source selected from the group consisting of photovoltaics, solar thermal source, wind power, hydroelectric power, marine power, geothermal source, biological source, waste, and a combination of two or more of the energy sources, and preferably, solar power generation equipment.

Both the power system 10 and the renewable energy generation part 20 may function as power sources that provide AC power to the load L. In general, AC power provided by the power system 10 is stable and regular but DC power and/or AC power provided by the renewable energy generation part 20 fluctuates depending on surrounding environmental factors such as climate conditions. Therefore, when excessive auxiliary power is provided from the renewable energy generation part 20 in a suitable surrounding environment, the sum of main power and auxiliary power provided to the load L may exceed the demand of power for the load (L), thus resulting in surplus power.

The surplus power, i.e., the surplus, may include at least one of the AC power provided from the power system 10 and the DC power and/or the AC power provided from the renewable energy generation part 20. Specifically, the surplus may include at least one of (i) DC power and/or AC power derived from excess auxiliary power provided from the renewable energy generation part 20, (ii) AC power derived from the main power when at least a portion of the excess auxiliary power is converted and provided in advance to the load L; and (iii) a combination of AC power and DC power derived from both the main power and the auxiliary power due to an interaction of the main power and the auxiliary power.

When a small amount of auxiliary power is provided from the renewable energy generation part 20 or auxiliary power is not substantially provided due to an inadequate surrounding environment, the sum of main power and auxiliary power provided to the load L does not meet the demand of power for the load L, thus resulting in power shortage.

Therefore, the power conversion part 30 may convert the surplus power, i.e., the surplus of the main power and/or the auxiliary power, and a result of converting the surplus may be directly stored in the energy storage 41 or in the hydrogen storage 423 by being converted into hydrogen by the water electrolysis part 42. When power shortage occurs as described above, DC power directly stored in the energy storage 41 may be added to the main power of the power system 10 by being converted into AC power by the control part 43 and the power conversion part 30, and hydrogen stored in the hydrogen storage 423 may be converted into DC power through a fuel cell to be described below, the DC power may be converted into AC power by the control part 43 and the power conversion part 30, and the AC power may be added to the main power of the power system 10.

Figure 2:
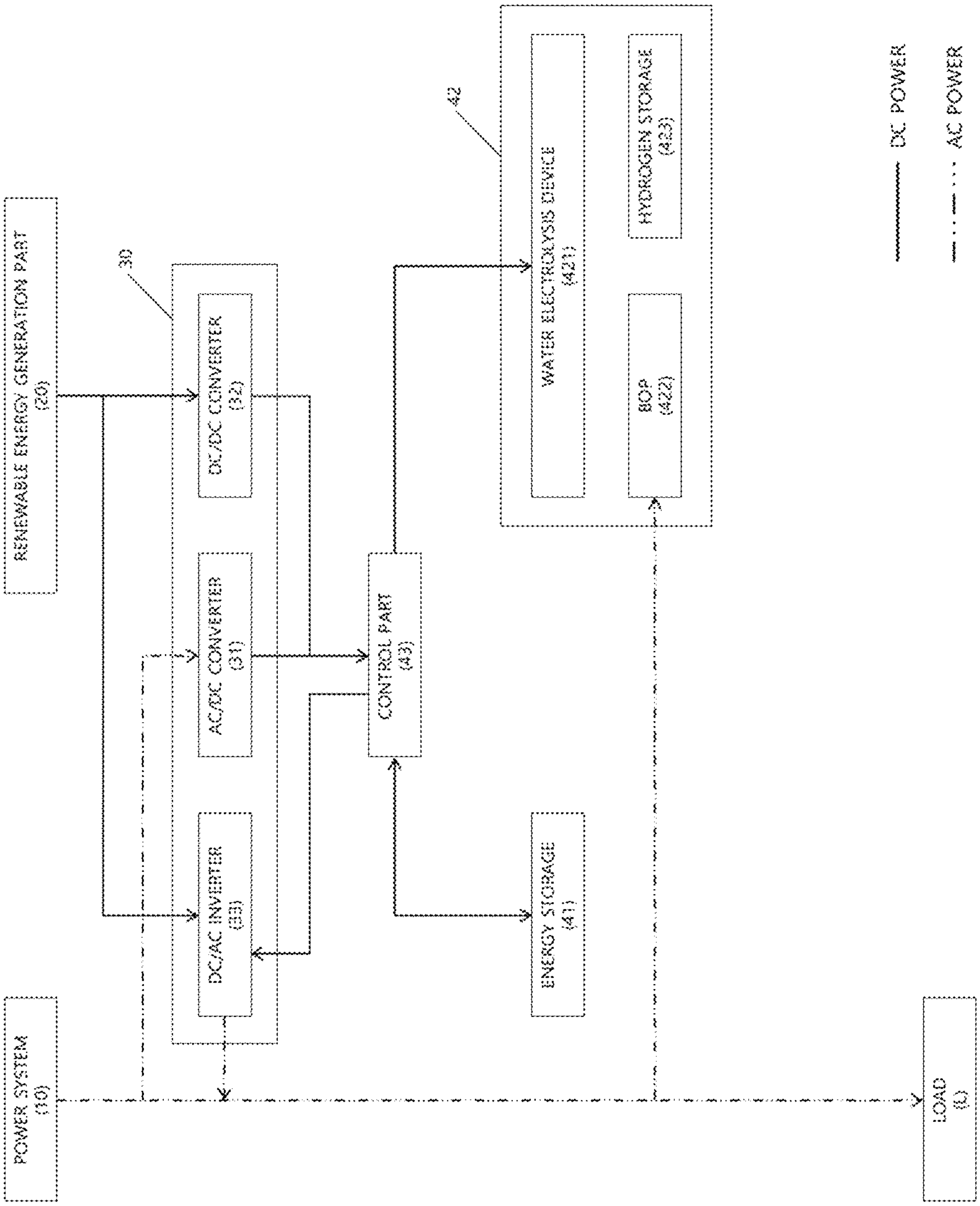
FIG. 2 illustrates a power management system according to another embodiment of the present disclosure.

FIG. 2 illustrates a power management system according to another embodiment of the present disclosure.

Referring to FIG. 2, the power conversion part 30 may include an AC/DC converter 31 that converts AC power provided from at least one of the power system 10 and the renewable energy generation part 20 into DC power and provides the DC power to the control part 43, and a DC/DC converter 32 that converts voltage of DC power provided from the renewable energy generation part 20 and provides the DC power converted by the DC/DC converter 32 to the control part 43.

The AC/DC converter 31 is a device or equipment that converts AC power input from at least one of the power system 10 and the renewable energy generation part 20 and outputs DC power, and the DC/DC converter 32 is a device or equipment that converts a voltage of DC power input from the renewable energy generation part 20 and outputs DC power compatible with the control part 43. A result of converting DC power converted by the AC/DC converter 31 and the DC/DC converter 32 may be provided to the control part 43 to be provided to the energy storage 41 and the water electrolysis part 42 connected to the control part 43.

The power conversion part 30 may further include a DC/AC inverter 33 that converts DC power provided from at least one of the renewable energy generation part 20 and the energy storage 41 into AC power and provides the AC power to the power system 10.

The DC/AC inverter 33 is a device or equipment that converts input DC power and outputs AC power, and may convert, into AC power, DC power provided from the renewable energy generation part 20 and the energy storage 41 and/or DC power provided from a fuel cell to be described below and supply the AC power to the power system 10 when power shortage occurs.

The water electrolysis part 42 may include a water electrolysis device 421 configured to be driven by the surplus converted by the power conversion part, a BOP 422 configured to be driven by a portion branched from the main power, and a hydrogen storage 423.

The water electrolysis device 421 is a device or equipment that produces hydrogen by electrolyzing water, and the generated hydrogen may be stored in the hydrogen storage 423. To produce hydrogen, a method of purifying water that can be obtained from nature and electrolyzing the purified water is preferred in aspects of economy and productivity. The water electrolysis device 421 may be driven by receiving the result of converting the surplus through the control part 43 or by receiving the surplus stored in the energy storage 41 through the control part 43 in some cases. Power to be input to drive the water electrolysis device 421 may be determined by the control part 43. A result of converting DC power by the power conversion part 30 may be selectively provided to the energy storage 41 or the water electrolysis device 421 or be divided and provided to the energy storage 41 and the water electrolysis device 421.

The result of converting the DC power by the power conversion part 30 may be concentrated in the control part 43, and the control part 43 may integrate or distribute and output the input result of converting the DC power. For example, at least some of the result of converting the DC power input to the control part 43 may be charged to the energy storage 41, and the rest may be consumed to drive the water electrolysis device 421 or discharged. The at least some of the result of converting the DC power charged in the energy storage 41 may be consumed to drive the water electrolysis device 421 through the control part 43 or discharged.

The water electrolysis device 421 may be driven in association with the amount of power stored in the energy storage 41. For example, the driving of the water electrolysis device 421 may start to convert input DC power into hydrogen when the amount of power stored in the energy storage 41 is 50% or more, preferably 60% or more, and more preferably 70% or more relative to a maximum charge amount.

The surplus provided from the power source (including the power system 10 and the renewable energy generation part 20) may be converted into DC power through the power conversion part 30, and the DC power may be primarily provided to charge the energy storage 41.

In the short view, in the power management system, when power shortage occurs, DC power charged in the energy storage 41 may be transmitted to the DC/AC inverter 33 to convert the DC power into AC power, and the AC power may be added to the main power provided from the power system 10.

However, because the energy storage 41 is only a device or equipment for storing power and power cannot be generated therethrough, there is a limit to storing and utilizing a surplus generated and accumulated continuously in connection between the power system 10 and the renewable energy generation part 20. Thus, the control part 43 may start the driving of the water electrolysis device 421 to convert input DC power into hydrogen when power stored in the energy storage 41 is 50% or more, preferably 60% or more, and more preferably 70% or more relative to a maximum charge amount.

In the long view, in the power management system, when power shortage occurs, hydrogen stored in the hydrogen storage 423 may be converted into DC power through a fuel cell to be described below, the DC power may be transmitted to the DC/AC inverter 33 to convert the DC power into AC power, and the AC power may be added to the main power provided from the power system 10.

At least some of hydrogen generated by the water electrolysis device 421 may be provided to various sources of demand, such as charging stations for charging hydrogen electric vehicles, after post-treatment, phase change, etc. are performed thereon.

The BOP 422 is a component or a peripheral device of the water electrolysis part 42 excluding the water electrolysis device 421, may include various devices or equipment necessary to transfer and/or exchange heat, power, and materials through the water electrolysis device 421, and may be understood to include the hydrogen storage 423 in some cases.

In the related art, a water electrolysis device and a BOP of a water electrolysis part are driven only by DC power converted by a power conversion part, but when an error occurs in the power conversion part and the like, the water electrolysis device cannot be driven stably, and in particular, there is a risk of hydrogen explosion due to the collapse of the balance of ambient conditions (temperature, pressure, etc.) controlled by the BOP to stably store pre-generated hydrogen.

The BOP 422 may be driven by power split from the main power. For example, the BOP 422 may be driven by AC power split from the main power. The AC power split from the main power may be converted into DC power by an AC/DC converter (not shown) between the main power and the BOP 422 to drive the BOP 422.

As described above, in the power management system, power is independently provided to the water electrolysis device 421 and the BOP 422 of the water electrolysis part 42 and thus pre-generated hydrogen can be stably stored by maintaining the supply of power to the BOP 422 even when the supply of power to the water electrolysis device 421 is cut off.

The control part 43 may synchronize power (particularly, voltages) provided to the power conversion part 30 and the water electrolysis device 421 with each other to exchange DC power therebetween. The control part 43 may synchronize power provided to at least one of the power conversion part 30 and the water electrolysis device 421 with power provided to the energy storage 41 to exchange DC power between two or more of the power conversion part 30, the water electrolysis device 421, and the energy storage 41. Meanwhile, the control part 43 may control the exchange of power among the power conversion part 30, the water electrolysis device 421, and the energy storage 41 and/or the exchange of power among the power conversion part 30, the water electrolysis device 421, the energy storage 41, and the power system 10 in connection with a system (not shown) that operates and controls the power system 10.

The power management system is set such that only DC power is input to or output from the control part 43 and voltages of the components connected to the control part 43 are synchronized to control the flow of energy through the control part 43 to minimize power loss in the power management system, and particularly, effectively lessen or suppress the auxiliary power provided from the renewable energy generation part 20.

Figure 3:
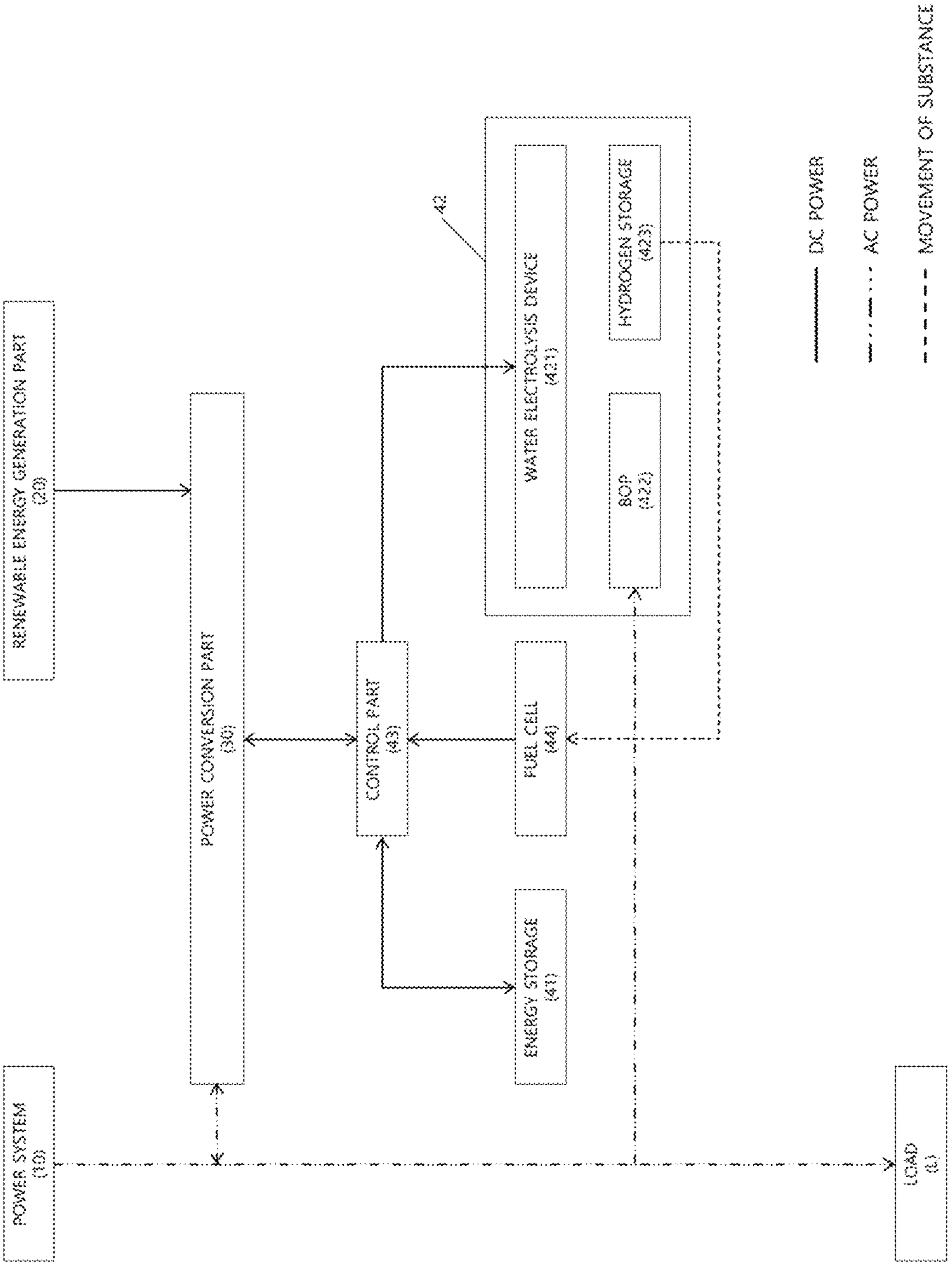
FIG. 3 illustrates a power management system according to another embodiment of the present disclosure.
Figure 4:
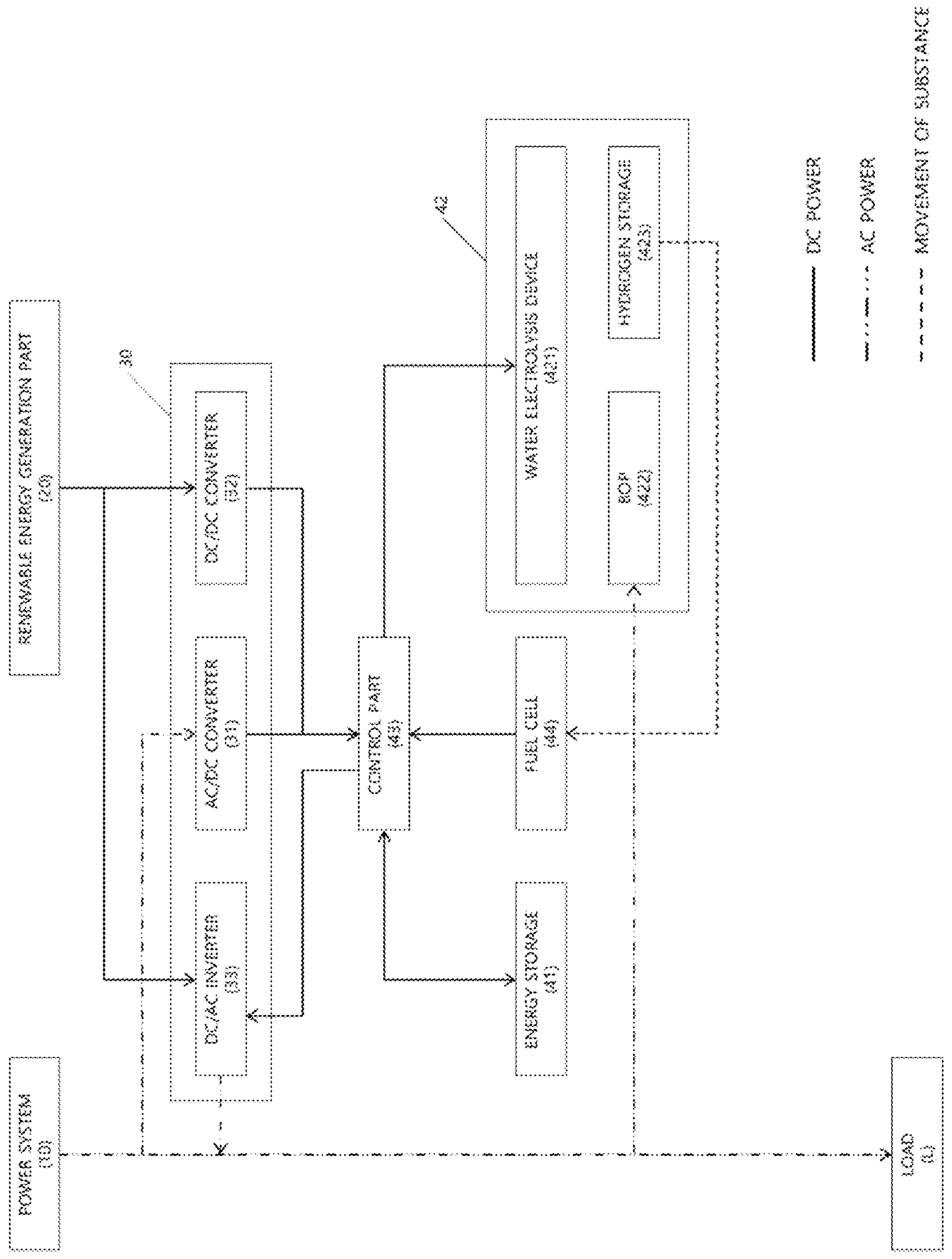
FIG. 4 illustrates a power management system according to another embodiment of the present disclosure.

FIGS. 3 and 4 illustrate power management systems according to other embodiments of the present disclosure.

Referring to FIG. 3, the power management system may further include a fuel cell 44 that generates DC power using hydrogen stored in the hydrogen storage 423.

The fuel cell 44 may also include a BOP (not shown) that includes a stack (not shown) and other components or peripheral devices. In this case, the BOP included in the water electrolysis part 42 and the BOP included in the fuel cell 44 may be referred to as a first BOP and a second BOP, respectively.

For stable driving of the fuel cell 44, the second BOP may be driven by power split from the main power. For example, the second BOP may be driven by AC power split from the main power. The AC power split from the main power may be converted into DC power by an AC/DC converter (not shown) between the main power and the second BOP to drive the second BOP.

DC power generated by the fuel cell 44 may be synchronized through the control part 43 and provided to at least one of the energy storage 41 and the water electrolysis device 421. Specifically, at least some of the DC power generated by the fuel cell 44 may be charged to the energy storage 41, and the rest may be consumed to drive the water electrolysis device 421 or discharged.

Referring to FIG. 4, when power shortage occurs, DC power generated by the fuel cell 44 may be converted into AC power through the control part 43 and the DC/AC inverter 33, and the AC power may be added to the main power provided from the power system 10.

Figure 5:
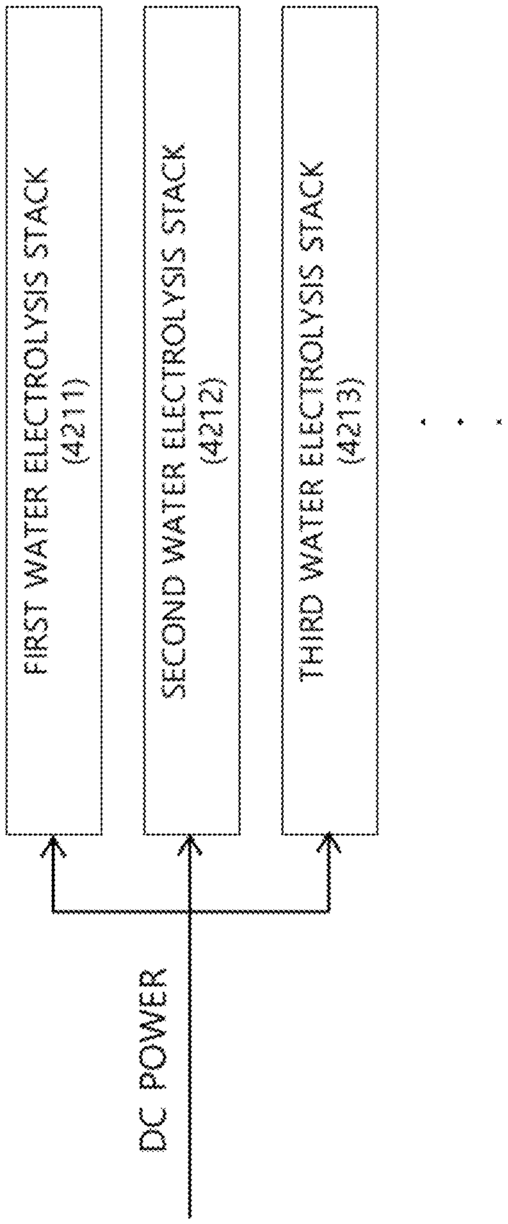
FIG. 5 illustrates a water electrolysis device according to an embodiment of the present disclosure.

FIG. 5 illustrates a water electrolysis device according to an embodiment of the present disclosure.

Referring to FIG. 5, the water electrolysis device 421 may be configured by connecting two or more water electrolysis stacks 4211, 4212, and 4213 with different driving power in parallel. The term "driving power" used herein should be understood as a minimum value of power required to start the driving of a water electrolysis device or stack.

To generate hydrogen by driving at least one of the water electrolysis stacks 4211, 4212, and 4213, the driving power of at least one of the water electrolysis stacks 4211, 4212, and 4213 should be less than or equal to the driving power of the water electrolysis device 421.

For example, when the driving power of the water electrolysis device 421 is 2 MW, the water electrolysis device 421 cannot be driven with less than 2 MW of power, but when the first water electrolysis stack 4211 with driving power of 1 MW, the second water electrolysis stack 4212 with driving power of 2 MW, and the third water electrolysis stack 4213 with driving power of 5 MW are connected in parallel to form the water electrolysis device 421, the first water electrolysis stack 4211 may be driven with less than 2 MW of power and thus the driving of the water electrolysis device 421 can be prevented from being completely stopped, thereby stably generating hydrogen.

The above description of the present disclosure is intended to provide examples, and it will be understood by those of ordinary skill in the art that modifications may be easily made without departing from the technical idea or essential features of the present disclosure. Therefore, it should be understood that the embodiments of the disclosure described above are merely examples in all respects and not restrictive. For example, a component described as a single type may be implemented in a distributed manner, and components described as being distributed may be implemented in a combined form.

The scope of the present disclosure should be defined by the following claims, and all changes or modifications derivable from the claims and their equivalents should be construed as being included in the scope of the present disclosure.

REFERENCE NUMERALS

10: power system
20: renewable energy generation part
30: power conversion part
31: AC/DC converter
32: DC/DC converter
33: DC/AC inverter
41: energy storage
42: water electrolysis part
43: control part
44: fuel cell
L: load

The invention claimed is:

1. A power management system comprising:

a power source including a power system configured to provide main power to a load and a renewable energy generation part configured to provide auxiliary power;

a power conversion part configured to convert a surplus of at least one of the main power and the auxiliary power;

a water electrolysis part including a water electrolysis device configured to be driven by the surplus converted by the power conversion part, a balance-of-plant (BOP) configured to be driven by a portion branched from the main power, and a hydrogen storage; and a control part configured to synchronize power applied to the power conversion part and power applied to the water electrolysis device to exchange direct current (DC) power between the power conversion part and the water electrolysis device, wherein power is independently provided to the water electrolysis device and the BOP of the water electrolysis part, and wherein the water electrolysis device is configured by connecting two or more water electrolysis stacks of different driving power in parallel.

2. The power management system of claim 1, further comprising an energy storage configured to store a portion of the surplus converted by the power conversion part.

3. The power management system of claim 2, wherein the water electrolysis device is driven by a portion of the surplus stored in the energy storage.

4. The power management system of claim 2, wherein the control part synchronizes power applied to at least one of the power conversion part and the water electrolysis device and power applied to the energy storage to exchange DC power between two or more of the power conversion part, the water electrolysis device, and the energy storage.

5. The power management system of claim 1, wherein the surplus comprises at least one of alternating current (AC) power provided from the power system and DC power and a AC power provided from the renewable energy generation part.

6. The power management system of claim 5, wherein the power conversion part comprises:

an AC/DC converter configured to convert AC power provided from at least one of the power system and the renewable energy generation part into DC power, and provide the DC power to the control part; and a DC/DC converter configured to convert voltage of DC power provided from the renewable energy generation part and provide the DC power converted by the DC/DC converter to the control part.

7. The power management system of claim 2, wherein the power conversion part further comprises DC/AC inverter configured to convert DC power provided from at least one of the renewable energy generation part and the energy storage into AC power and provide the AC power to the power system.

8. The power management system of claim 1, further comprising a fuel cell configured to generate DC power using hydrogen stored in the hydrogen storage.

9. The power management system of claim 8, wherein the DC power generated by the fuel cell is synchronized through the control part to be provided to at least one of the energy storage and the water electrolysis device.

10. The power management system of claim 2, further comprising a fuel cell configured to generate DC power using hydrogen stored in the hydrogen storage.

11. The power management system of claim 10, wherein the DC power generated by the fuel cell is synchronized through the control part to be provided to at least one of the energy storage and the water electrolysis device.

12. The power management system of claim 2, wherein the water electrolysis device starts driving when an amount of power stored in the energy storage is 50% or more of a maximum charging amount.

13. The power management system of claim 1, wherein the driving power of at least one of the water electrolysis stacks is less than or equal to driving power of the water electrolysis device.

* * * * *